UNITED STATES PATENT OFFICE.

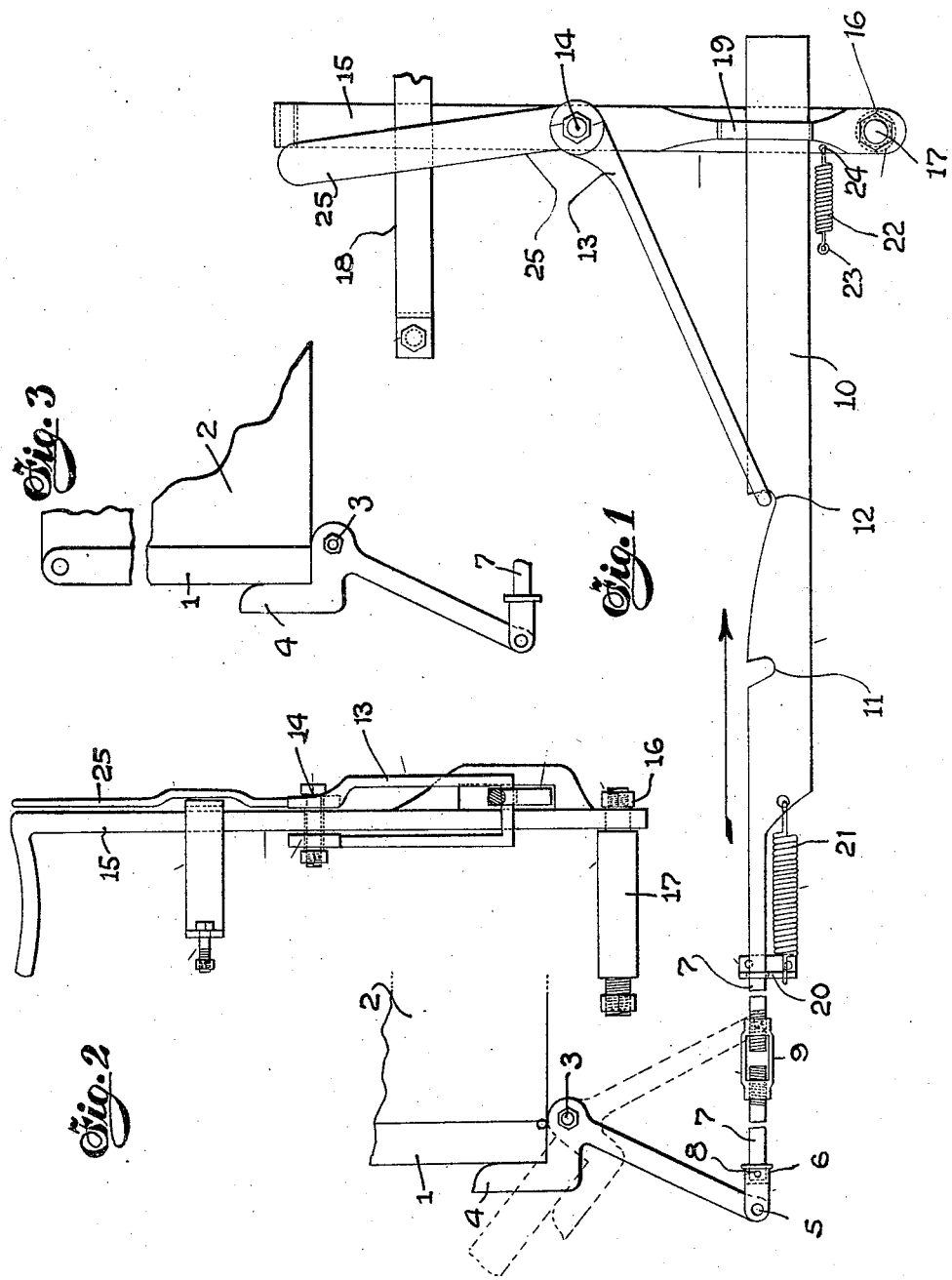

CLARENCE B. BEYER, OF ALBUQUERQUE, NEW MEXICO, ASSIGNOR OF THREE-EIGHTHS TO PAUL G. REDINGTON AND ONE-FOURTH TO FRANK L. McNAMA, BOTH OF ALBUQUERQUE, NEW MEXICO.

TRIPPING DEVICE.

1,416,161.    Specification of Letters Patent.    Patented May 16, 1922.

Application filed July 24, 1919. Serial No. 313,055.

*To all whom it may concern:*

Be it known that I, CLARENCE B. BEYER, a citizen of the United States, and a resident of Albuquerque, in the county of Bernalillo and State of New Mexico, have invented an Improvement in Tripping Devices, of which the following is a specification.

The present invention relates to an improvement in tripping devices, and finds its application more particularly to the end gates of dump bodies mounted on motor-propelled vehicles and the like. One object of the invention is to provide a tripping device by means of which the driver of a vehicle may release the end gate in order to permit the dumping of the contents of the body, and thereafter secure the end gate in closed position without leaving his seat adjacent to the drive and dump-control mechanism of the vehicle.

One embodiment of my invention is illustrated in the drawings accompanying the present specification, and in which, Figure 1 is a view, partly fragmentary, of a suitable latch for an end gate and tripping means operatively connected therewith, Figure 2 a rear view of the foot-operated portions of said tripping apparatus, and Figure 3 a modification illustrating the application of the latch and tripping device to an end gate which is pivotally mounted to permit opening from the bottom instead of from the top.

Referring to Figure 1, a bottom-pivoted end gate 1 of a conventional dump body 2 forming part of a vehicle, may be retained normally in closed position by means of a lever arm pivoted at 3, one end 4 of said lever arm being adapted to engage the end gate and the other end being pivotally connected at 5 with a clevis 6, to which may be secured a rod 7 by any suitable means, here shown as a pin 8. To permit adjustment of the length of the rod 7, it is preferably formed in two or more sections which may be joined by means of a turnbuckle 9. The opposite end of said rod 7 may be provided with a relatively flattened portion 10, having latch-receiving notches 11 and 12 adapted to engage a latch 13 pivotally mounted at 14 on a foot-operated lever 15, which in turn is pivotally mounted at 16 on a pin 17 which is secured in any suitable manner to a fixed portion of the vehicle body. A lever-guiding member 18 may also be secured to any suitable fixed portion of the vehicle to receive and retain a foot-operated lever in normal operative position. If desired, an interior surface of this lever guide may be provided with ratchet teeth adapted to engage with similar tooth projections on the lever arm for the purpose of retaining said lever in any desired position against resistance of the springs hereafter to be described. A guide member 19 is also provided for the relatively flattened end 10 of the rod 7, said guide 19 being secured to or forming a part of the foot-operated lever 15. A further guide and support for the rod 7 may comprise a bracket 20 adapted to be secured to the framework of the vehicle, and also having means for engaging one end of a torsion spring 21, the other end of said spring being in engagement with the flattened portion 10. A second spring 22 has one end secured to the framework of the vehicle at 23, and its other end secured to the lever 15 at 24, both springs 21 and 22 being arranged and adapted to retain the rod 7 and the foot-operated lever 15 normally in retracted end-gate-closing position.

In operation, it is contemplated that the end gate of a vehicle may be released and permitted to swing open by deflecting the gate-engaging member 4 downwardly. This is ordinarily accomplished by the driver pushing forward on the foot-operated lever 15, said forward motion being transmitted to the rod 7 by means of latch 13 engaging in one of the notches 11 or 12. The rod is thus pulled forward against resistance of the springs 21 and 22, and the member 4 is deflected sufficiently to permit opening of the gate. When the dump body of the vehicle is in normal load-carrying position, the end-gate-opening operation may be effected with latch 13 engaging notch 12 of the flat portion 10. However, when the dump body is tilted, the parts necessarily assume a slightly different relation. It is contemplated that the rod 7 may under these conditions be thrust forward to some degree by the change in position of the rear end of the dump body. To permit tripping of the end-gate latch under these conditions, a notch 11 is provided at a convenient point in the flat portion 10 so that latch 13 may engage said notch 11 for the purpose of drawing the rod 7 forward when the operator pushes forward on the foot-operated lever 15.

In order that the tripping mechanism may resume normal position upon return of the dump body to normal load-carrying position, the latch 13 has secured to it a lever 25 in such position that the free end of said lever may be conveniently kicked by the driver or operator in order to detach the free end of latch 13 from engagement with notch 11. This permits the latch 13 to slide back again to engagement with notch 12 as the body again returns to normal horizontal position on the frame of the vehicle.

When the end gate is pivoted at the bottom and therefore swings open at the top, it is contemplated that the torsion springs, hereinabove referred to, shall be strong enough to return said gates to normal closed position as soon as the operator releases the lever 15 from the pressure of his foot. In the modification shown in Figure 3, the end gate will swing out of engagement with portion 4 and it will therefore be necessary either to hold the end gates in closed position or to close the same by bringing the body into normal horizontal position after which the foot pressure on lever 15 may be released to permit locking of the gate in closed relation by means of member 4.

I claim:

1. In an end gate tripping device, the combination of a gate-engaging member, a tripping lever, a rod between said member and said lever, and means interposed between said rod and said tripping lever to permit adjustable operating engagement of said tripping lever with the actuating rod without varying the effective length of said rod.

2. In an end gate tripping device, the combination of a gate-engaging member normally held in yielding gate-closing position, a tripping lever, a rod between said member and said lever, and a latch secured to said lever and adapted to engage a detent in said rod whereby the rod may be moved to deflect the gate-engaging member from gate-closing position by deflecting the free end of said tripping lever.

3. The combination with a vehicle having a frame and a dump body, of means operable from the driving end of said vehicle for locking the end gate of said dump body, and means for tripping said locking means to release said gate, said locking means including a gate-engaging member pivoted to the vehicle body and said tripping means including a lever at the driving end of the vehicle and a rod connecting said lever with the tripping means, whereby when the lever is deflected the tripping means will deflect the locking means to permit opening of the end gate and means interposed between said rod and said lever to selectively engage said rod in predetermined operative positions for effectively actuating the tripping means in normal and dumping positions respectively of the dump body.

4. The combination with a vehicle having a frame and a dump body, of means operable from the driving end of said vehicle for locking the end gate of said dump body, means for tripping said locking means to release said gate, said locking means including a gate-engaging member pivoted to the vehicle body and said tripping means including a lever at the driving end of the vehicle and a rod connecting said lever with the tripping means, whereby when the lever is deflected the tripping means will deflect the locking means to permit opening of the end gates, and spring means for returning said lever, rod, and gate-locking member to gate-locking position upon release of pressure from the lever.

5. The combination with a vehicle having a frame and a dump body, of means operable from the driving end of said vehicle for opening and closing the end gate of said dump body, including an end-gate-engaging member movable with the body, a tripping lever pivoted to the frame, and a rod pivotally connected to said member and mounted to be slidable with respect to said lever when the dump body is moved to and from dumping position, and special means on the rod for operatively connecting said lever with said rod when the body is in dumping, and in load-carrying positions respectively.

6. The combination with a vehicle having a frame and a dump body, of means operable from the driving end of said vehicle for opening and closing the end gate of said dump body when the body is in dumping position with respect to the frame, said means including a gate-engaging member, a rod connected therewith, a lever, a latch detachably connecting said rod and lever, and means for disengaging said latch from said rod.

7. In an end gate tripping device for dump body vehicles, the combination of a gate engaging member, a tripping lever, a rod between said member and said lever, means for operatively connecting said lever to said rod at different positions along the rod, and means for disengaging said connecting means from said positions.

In testimony whereof, I have signed my name to this specification this 16th day of July, 1919.

CLARENCE B. BEYER.

Certificate of Correction.

It is hereby certified that in Letters Patent No. 1,416,161, granted May 16, 1922, upon the application of Clarence B. Beyer, of Albuquerque, New Mexico, for an improvement in "Tripping Devices," an error appears in the printed specification requiring correction as follows: Page 2, line 97, claim 5, for the word "special" read *spaced;* and that the said Letters Patent should be read with this correction therein that the same may conform to the record of the case in the Patent Office.

Signed and sealed this 6th day of June, A. D., 1922.

[SEAL.] WM. A. KINNAN,

*Acting Commissioner of Patents.*